United States Patent Office 3,042,692
Patented July 3, 1962

3,042,692
EPOXY ETHER POLYAMIDES
Thomas W. Findley, La Grange, Ill., assignor to Swift & Company, Chicago, Ill., a corporation of Illinois
No Drawing. Filed Apr. 8, 1957, Ser. No. 651,161
7 Claims. (Cl. 260—404.5)

This invention relates to new compositions of matter and more particularly to polyamides of epoxidized fatty materials. These compounds may be exemplified by the following formula for the diamide:

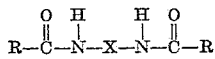

in which R is an aliphatic alkyl group containing from 10 to 20 carbon atoms containing at least one epoxy group and where X is alkyl or aryl. Compositions which are also within the scope of this invention are those which contain three or more amido groups attached to epoxy-containing fatty acyl radicals.

The epoxy polyamides may be prepared either by epoxidizing unsaturated fatty polyamides or by the selective aminolysis of an ester of the epoxy-containing material with a polyamine. Bis (epoxy stearamido) ethane, for example, may be prepared in the former method by the epoxidation of dioleoyl ethylenediamine, while production of the same compound by the latter method is best illustrated by the reaction between methyl epoxystearate and ethylenediamine.

The epoxidation reaction may be carried out by one of the known epoxidation procedures employing one of the per acids such as performic acid, percetic acid, or perphthalic acid. The selective aminolysis reaction is surprising in that the reaction takes place between the amine group of the polyamine and the carbonyl group of the epoxy ester while the epoxidized configuration is left undisturbed.

The epoxy aliphatic acids and esters included within the scope of this invention are those acids and esters containing from 10 to 22 carbon atoms in the acyl portion of the molecule. These acids may be derived from naturally-occurring fatty materials having a substantial portion of unsaturated acids, i.e., monoethenoid, diethenoid, and triethenoid. The unsaturated acids of most common occurrence in fatty glycerides are: oleic, (cis Δ9,10 octadecenoic), palmitoleic (Δ9,10-hexadecenoic), linoleic (cis Δ9,10-cis Δ12,13 octadecadienoic), linolenic (Δ9,10,12,13, 15,16-octadecatrienoic), and ricinoleic (12-hydroxy-Δ9, 10 octadecenoic) acids.

Other fatty acids of less common occurrence include Δ9,10- and Δ4,5-decenoic acid; Δ3,4-, Δ4,5-, and Δ9,10-dodecenoic acid; 9,10-tetradecenoic acid (myristoleic acid), and Δ4,5- and Δ5,6-tetradecenoic acid; cis Δ6,7-octadecenoic acid (petroselenic acid); Δ11,12-octadecenoic acid (vaccenic acid); Δ9,10-eicosenoic acid (gadoleic acid); Δ11,12-eicosenoic acid; Δ6,7,10,11,14,15-hexadecatrienoic acid; and cis Δ13,14-docosenoic acid (erucic acid). Also included are unsaturated materials such as undecylenic and acetyl ricinoleic acids.

Amines which may be used in the preparation of the novel compositions of this invention include polyamines generally, such as di-, tri- and tetramines. Specific examples of these compositions are ethylenediamine, tetramethylenediamine, pentamethylenediamine, diethylenetriamine, triethylenetetramine, and substituted diamines such as 2,4 diamino-2-methylpentane as well as aromatic diamines such as phenylene diamine. While in the examples which follow ethylenediamine is the preferred polyamine employed in forming bis (acylamido) alkane, it should be understood that triamines will form the corresponding tris-amido compound, while a tetramine produces a tetrakis configuration.

The following examples, which illustrate methods of preparing compositions representative of this invention, are to be considered in no way limitative, the scope of the invention being defined by the appended claims.

EXAMPLE I

Bis (Epoxystearamido) Ethane 58.5 grams dioleoylethylenediamine (prepared by the reaction between an excess of oleoyl chloride and ethylenediamine in pyridine and purification of the resulting product) is dissolved in 200 ml. benzene. The mixture is stirred and 50 ml. of 40% peracetic acid is added to the benzene solution. After 2 hours stirring and holding the temperature at about 50° C., a solid material starts to form, and an additional 100 ml. of benzene is added. After an additional 2 hours stirring, the reaction is stopped, and the benzene solution is washed with water, dilute sodium bicarbonate solution, and again with water. The benzene is evaporated on the steam bath, leaving a porous solid cake. The last traces of benzene are removed from this porous cake by means of vacuum. The light colored solid product has an oxirane oxygen content of 4.9%. Theoretical oxirane oxygen content=5.18%.

EXAMPLE II

Bis (Epoxystearamido) Ethane by Selective Amidation

A mixture of 5 grams freshly distilled ethylenediamine and 60 grams methylepoxystearate (oxirane oxygen =4.9%) is stirred continuously for 24 hours, while the temperature is maintained at about 100° C. At the end of this time, the reaction mixture is cooled, and the resulting product is washed with diethyl ether to remove unreacted methyl esters. The solid bis (epoxystearamido) ethane remaining after removal of all traces of ether contains 4.7% oxirane oxygen.

EXAMPLE III 124 grams epoxidized methyl-linoleate (from safflower oil) and 10 grams diethylenetriamine are admixed, and the mixture is heated to 150° C. and held at this temperature for about 2 hours under 100 mm. vacuum. At the end of this time, the reaction mixture is cooled and washed twice with hexane to remove excess methyl esters. The product is principally

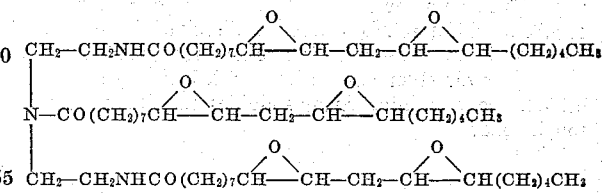

EXAMPLE IV

Bis(undecanoamido) benzene is prepared by reacting 1 mole of phenylene diamine with 2.2 moles undecylenic acid chloride in pyridine solution. The product is purified by washing with 5% sodium hydroxide solution and also with water. This diamide is dissolved in about 5 volumes of benzene and then epoxidized by the addition of 2.5 moles (500 ml. of 40%) peracetic acid. The procedure involves stirring the benzene solution of the diamide vigorously while the peracetic acid is added to the solution. The temperature is maintained at about 60° C. during the addition of the peracetic acid and for 6 hours more. The reaction mixture is then cooled and the benzene solution is washed with warm water, dilute sodium bicarbonate, and again with water. Removal of the benzene yields a light colored solid, which is principally bis (epoxyundecanoamido) benzene having an oxirane oxygen content of 5.1%.

The epoxy polyamides disclosed and claimed herein are valuable compositions inasmuch as they form insoluble infusible cross-linked polyether polyamide resins. These resins find use in tooling and structural materials and in electrical components and wire coatings.

In one method of preparing the cross-linked products, the compositions of this invention are reacted with a cross-linking agent, such as a Lewis acid, to break the oxirane configuration and form ether linkages between molecules. For example, bis (epoxy stearamido) ethane may be converted to a cross-linked resin by an exothermic reaction in the presence of $BF_3$. The resulting polyether polyamide resin which contains repeating stearamido groups cross-linked through ether linkages is a clear, heat resistant resinous product.

The production of the cross-linked product from the epoxy fatty amide may be illustrated by the following structural formulae:

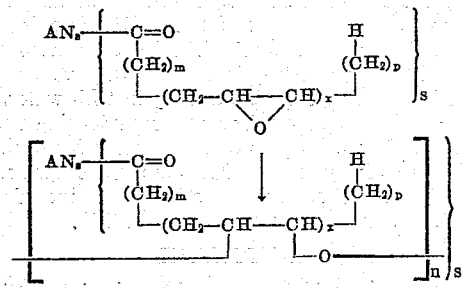

wherein A is an aliphatic or aromatic group having a valence $s$. $s=2-8$ and is the number of fatty chains per molecule. $x=1-3$ and is the number of epoxy groups per fatty chain. $m$ and $p$ are numbers from 0–15. $n$ is 2 or more and $m+3x+p+1=10-22$.

Another method of preparing the cross-linked polyamide is by way of amidation of the polyether epoxy fatty acid or ester. In this modification of the cross-linking procedure, the oxirane configuration is broken prior to the amidation of the ester groups of the epoxy-containing material. By this method, methyl epoxystearate may be treated with a polymerization catalyst to form a polyether which may then be amidated with the desired polyamine.

The following examples show the aforementioned methods of producing the cross-linked product:

EXAMPLE V 25 grams of bis (epoxystearamido) ethane prepared in accordance with the procedure set forth in Example I is admixed with 1 ml. $BF_3$-etherate dissolved in 10 ml. of diethyl ether, and an immediate exothermic reaction takes place. As the ether boils off as a result of the heat generated, the remaining foam solidifies to give a flexible, tough solid.

EXAMPLE VI

The purified methyl esters of polyether fatty acids [1] (15 grams) and 1.5 grams of ethylenediamine are mixed, and the mixture is stirred. The liquid reactants are not miscible at room temperature, but dissolve on warming. The mixture is heated until the temperature reaches 200° C. At about 160° C. some evolution of methanol is apparent. Heating at 200° C. is continued for about 10 minutes, and the mixture is then cooled. A tough, flexible solid, which is insoluble in organic solvents, is obtained. The solid product is somewhat soluble in alcoholic KOH after prolonged boiling.

Obviously, many modifications and variations of the invention as hereinbefore set forth may be made without departing from the spirit and scope thereof, and, therefore, only such limitations should be imposed as are indicated in the appended claims.

---
[1] Prepared in accordance with the method set forth in co-pending application Serial No. 651,822 filed April 10, 1957.

I claim:

1. A polyether polyamide of 10–22 carbon fatty acids in which the acyl groups of said fatty acids are cross-linked through ether groups located on contiguous carbons of the fatty acid chains.

2. A polyether polyamide in accordance with claim 1 wherein the polyamide is a diamide.

3. A polyether polyamide in accordance with claim 1 wherein the polyamide is a triamide.

4. A polyether polyamide in accordance with claim 1 wherein the polyamide is a tetramide.

5. A process for preparing cross-linked polyether polyamides of oxirane-containing 10–22 carbon fatty acids comprising: heating and reacting said polyamide with a strong Lewis acid to break the oxirane configuration and cross-link the fatty chains of said fatty acids through contiguously substituted ether groups.

6. A process for preparing cross-linked polyether polyamides of oxirane-containing 10–22 carbon fatty acids comprising: heating and reacting said polyamide with boron trifluoride to break the oxirane configuration and cross-link the fatty chains of said fatty acids through contiguously substituted ether groups.

7. The process of claim 6 wherein the polyamide is bis-(epoxystearamido) ethane.

References Cited in the file of this patent

UNITED STATES PATENTS

| | | |
|---|---|---|
| 2,450,940 | Cowan et al. | Oct. 12, 1948 |
| 2,555,111 | Bradley | May 29, 1951 |
| 2,673,861 | Weisblat et al. | Mar. 30, 1954 |
| 2,682,547 | Clemens et al. | June 29, 1954 |
| 2,730,531 | Payne et al. | Jan. 10, 1956 |
| 2,743,285 | Wilkes et al. | Apr. 24, 1956 |
| 2,745,846 | Dazzi | May 15, 1956 |
| 2,890,228 | Forster | June 9, 1959 |